United States Patent
Marten

(10) Patent No.: US 11,553,277 B2
(45) Date of Patent: *Jan. 10, 2023

(54) SYSTEMS AND METHODS FOR FACILITATING CONFIGURATION OF AN AUDIO SYSTEM

(71) Applicant: DISH Network L.L.C., Englewood, CO (US)

(72) Inventor: Neil Marten, Lakewood, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/327,284

(22) Filed: May 21, 2021

(65) Prior Publication Data

US 2021/0281951 A1    Sep. 9, 2021

Related U.S. Application Data

(63) Continuation of application No. 16/596,475, filed on Oct. 8, 2019, now Pat. No. 11,044,559.

(51) Int. Cl.
| | | |
|---|---|---|
| H04R 5/04 | (2006.01) | |
| H04R 3/12 | (2006.01) | |
| H04R 5/02 | (2006.01) | |
| H04N 21/439 | (2011.01) | |
| H04N 21/422 | (2011.01) | |
| G06F 3/0482 | (2013.01) | |
| H04N 21/485 | (2011.01) | |

(52) U.S. Cl.
CPC ............. *H04R 5/04* (2013.01); *G06F 3/0482* (2013.01); *H04N 21/42204* (2013.01); *H04N 21/439* (2013.01); *H04N 21/4852* (2013.01); *H04R 3/12* (2013.01); *H04R 5/02* (2013.01); *H04R 2430/01* (2013.01)

(58) Field of Classification Search
None
See application file for complete search history.

(56) References Cited

U.S. PATENT DOCUMENTS

| | | |
|---|---|---|
| 2016/0073197 A1 | 3/2016 | Hammer et al. |
| 2017/0041724 A1 | 2/2017 | Master et al. |
| 2017/0245087 A1 | 8/2017 | Baba |
| 2018/0176688 A1 | 6/2018 | Baek et al. |
| 2019/0214954 A1 | 7/2019 | Coover et al. |
| 2019/0372541 A1 | 12/2019 | Friant et al. |

*Primary Examiner* — Paul W Huber
(74) *Attorney, Agent, or Firm* — Jeremiah J. Baunach; VLP Law Group LLP

(57) ABSTRACT

A system for facilitating configuration of an audio system tests the existing audio system configuration by playing reference audio clips of various different genres of programming, the audio of which is received by a microphone of a remote control device or other handheld mobile device at various different listening points in the room. The system then compares the audio signal representing audio of the reference audio clip received at the microphone to a reference audio signal representing the reference audio clip and determines other audio characteristics. The system then determines, based on the comparison and other characteristics of the room (e.g., furniture layout, room construction materials, wall treatments and current speaker positioning) suggested changes to a configuration of the audio system to increase audio quality of the audio system for playing audio associated with the various different genres of programming.

11 Claims, 8 Drawing Sheets

SYSTEMS AND METHODS FOR FACILITATING CONFIGURATION OF AN AUDIO SYSTEM

TECHNICAL FIELD

The technical field relates to audio system configuration, and particularly to facilitating configuration of an audio system.

BRIEF SUMMARY

Configuration of audio systems, such as television settings, furniture layout and surround sound speaker positioning in home entertainment systems and home theaters, often affects the quality of the audio heard by listeners at various different listening points in the room and for various different genres of programming. For example, depending on the phasing of overlapping sound waves output by the audio system, they can amplify or diminish a particular frequency range in the audio spectrum in a specific area of the room. Thus, based on the configuration of the audio system (e.g., the shape of the room, the furniture of the room, the construction materials of the room, wall treatments and the speaker positioning within the room) a first listening point within the room may have a different mix of phasing of overlapping sound waves than at a second listening point in the room. Volume and frequencies may also differ in various places in the room and, depending on how sound waves overlap in the room, certain sound can get diminished or cancelled out However, adjusting the configuration to optimize or increase such audio quality can be a difficult and time consuming process for customers, as it is not always apparent which configurations and settings are causing which degradations or improvements to sound quality and how to adjust such configurations to maximize or increase the accuracy, fidelity, and/or intelligibility of the audio for different genres of programming.

The present disclosure provides a technical solution to the above technical problem by first running an automated audio test to test the existing audio system configuration by playing reference audio clips of various different genres of programming, the audio of which is received by a microphone of a remote control device or other handheld mobile device at various different listening points in the room. In this manner, the system may compare the audio signal representing audio of the reference audio clip received at the microphone to a reference audio signal representing the reference audio clip to determine how closely they match and to determine other audio characteristics. The system may then determine, based on the comparison and, in some embodiments, other characteristics of the room (e.g., furniture layout, room construction materials, wall treatments and current speaker positioning) suggested changes to a configuration of the audio system to increase audio quality of the audio system for playing audio associated with the various different genres of programming. This increases the efficiency and accuracy of configuring the audio system to increase sound quality by avoiding the customer having to go through a long trial and error process of adjusting various configurations each time a different genre of programming is being played until the sound quality appears to have improved by just listening to the audio.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

Figure 1:
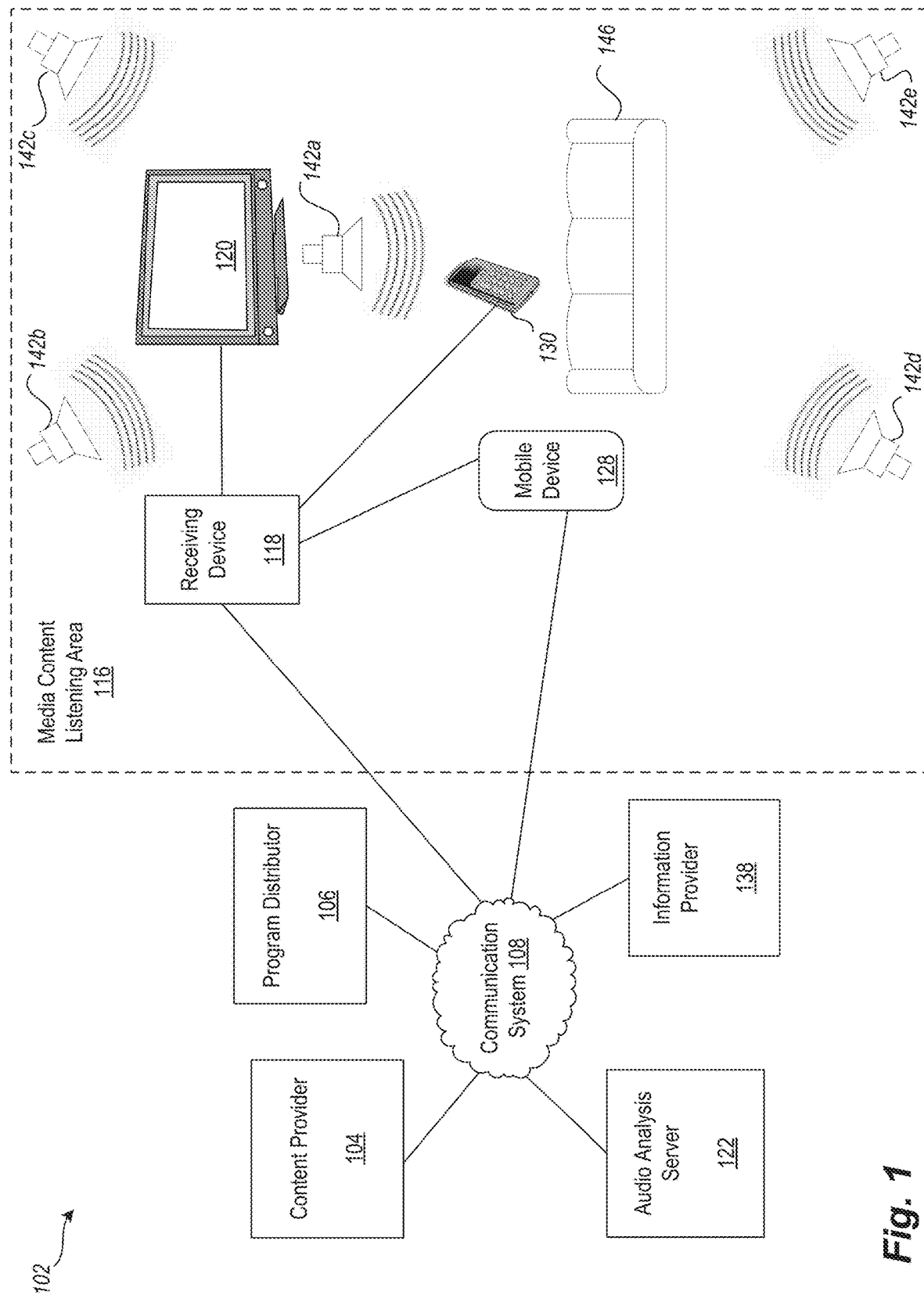
FIG. 1 is an overview block diagram illustrating a technical environment in which embodiments of systems and methods for facilitating configuration of an audio system may be implemented, according to an example embodiment.

FIG. 1 is an overview block diagram illustrating a technical environment in which embodiments of systems and methods for facilitating configuration of an audio system may be implemented, according to an example embodiment.

Before providing additional details regarding the operation and constitution of methods and systems for facilitating configuration of an audio system, the example technical environment 102, within which such a system may operate, will briefly be described.

In the technical environment 102, audio, video, and/or data service providers, such as television service providers, provide their customers a multitude of video and/or data programming (herein, collectively "programming" or "content"). Such programming is often provided by use of a receiving device 118 communicatively coupled to a presentation device 120 configured to receive the programming. The programming may include any type of media content, and media content of various different genres including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

In one embodiment, the receiving device 118 is a device such as a set-top box, television, a digital video recorder (DVR), a digital versatile disk (DVD) player, PC, tablet device, game machine, smart phone, mobile device or other computing device or media player configured to receive programming via a connection to a satellite or cable television service provider outside the media content listening area 116 and to display such programming on a presentation device 120. For example, the receiving device 118 may be configured to receive, process and display on the presentation device 120 programming received directly from the satellite or cable television service provider, such as cable or satellite television broadcasts via various physical and logical channels of communication of communication system 108. Also, the receiving device 118 may be configured to receive, process and display on the presentation device 120 streaming media content received directly from the satellite or cable television service provider and/or other content provider 104.

The receiving device 118 interconnects to one or more communications media or sources. For example, the various media content may be delivered as data using the Internet Protocol (IP) suite over a packet-switched network such as the Internet or other packet-switched network, which may be included as part of the communication system 108. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it. The receiving device 118 also includes, or is operably coupled directly or indirectly to, and may control one or more speakers 142a-142e that output audio of media content (such as received programming) and/or a plurality of reference audio clips associated with different genres of programming. For example, the receiving device 118 may perform an automated audio test to test the existing audio system configuration of the media content listening area 116 by playing reference audio clips of various different genres of programming via speakers 142a-142e, the audio of which is received by a microphone of the remote control device 130 or other handheld mobile device 128 at various different listening points in the media content listening area 116.

The receiving device 118 or audio analysis server 122 may compare the audio signal representing audio of the reference audio clip received at the microphone to a reference audio signal representing the original reference audio clip to determine how closely they match and to determine other audio characteristics. The receiving device 118 or audio analysis server 122 may then determine, based on the comparison and, in some embodiments, other characteristics of the media content listening area 116 (e.g., furniture layout of furniture 146, room construction materials and current speaker positioning of speakers 142a-142e) suggested changes to a configuration of the audio system of the media content listening area 116 to increase audio quality of the audio system for playing audio associated with the various different genres of programming. This increases the efficiency and accuracy of configuring the audio system to increase sound quality by avoiding the customer having to go through a long trial and error process of adjusting various settings of the audio system of the media content listening area 116 each time a different genre of programming is being played until the sound quality appears to have improved by just listening to the audio.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," "gaming console" and/or "television tuner," etc. Accordingly, the receiving device 118 may be any suitable converter device or electronic equipment that is operable to receive programming via a connection to a satellite or cable television service provider outside the media content listening area and communicate that programming to another device over a network. Further, the receiving device 118 may itself include user interface devices, such as buttons or switches.

Examples of a presentation device 120 may include, but are not limited to, one or a combination of the following: a television ("TV"), a personal computer ("PC"), a sound system receiver, a DVR, a DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a media content listening area 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In many embodiments, a remote-control device (remote) 130 is operable to control the receiving device 118 and/or the presentation device 124. The remote control device 130 typically communicates with the receiving device 118 using a suitable wireless medium, such as infrared (IR), radio frequency (RF), or the like. The remote control device 130 may include a microphone that may be voice or audio activated in order to receive a plurality of audio data samples each representing audio of the reference audio clip being played and received at the microphone at different listening points within the media content listening area 116. Such audio samples may be recorded and stored by the remote control device 130 and/or communicated to the receiving device 118 and/or audio analysis server 122 for further processing and analysis. In some embodiments, the remote control device 130 may be a voice-enabled remote and the same microphone may also be used to receive voice commands from the user and transmit corresponding commands to the receiving device 118 and/or presentation device 120.

In the example embodiment shown in FIG. 1, handheld mobile device 128 may be communicatively connected to the television receiving device 118 via a physical or a peer-to-peer short range wireless connection. For example, mobile device 128 may be a handheld mobile device of a user (e.g., a television service provider technician or customer), such as a smartphone, tablet device or other computing or communications device. There may be fewer or additional mobile devices in various embodiments. The mobile device 128 may communicate over communication system 108 with the television receiving device 118, program distributor 106, content provider 104, audio analysis server 122 and/or information provider 138 using the transmission control protocol/Internet protocol (TCP/IP) suite of networking communication protocols. In the present example, a cable or satellite television service provider may encompass or be in communication with some or all of the content provider 104, program distributor 106, audio analysis server 122, and information provider 138. In some embodiments, the mobile device 128 may store and/or initiate playing of the reference audio clips, such as via communication with the receiving device 118 and/or directly with the speakers 142*a*-142*e*.

In some embodiments, the mobile device 128 may be equipped with a microphone that receives the plurality of audio data samples each representing audio of the reference audio clip being played and received at the microphone of the mobile device 128 at different listening points within the media content listening area 116. Such audio samples may be recorded and stored by the mobile device 128 and/or communicated to the receiving device 118 and/or audio analysis server 122 for further processing and analysis. In some embodiments, the mobile device 128 may be a voice-enabled mobile device 128 and the same microphone of the mobile device 128 may also be used to receive voice commands from the user and transmit corresponding commands to the receiving device 118.

A content provider 104 provides program content, such as television content, to a distributor, such as the program distributor 106. Example program distributors include, but are not limited to, satellite and cable television service providers. Example content providers include television stations which provide local or national television programming and special content providers which provide premium based programming, streaming services, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode ("ATM") systems, frame relay systems, digital subscriber line ("DSL") systems, radio frequency ("RF") systems, telephone systems, cellular systems, and the Internet.

In at least one embodiment, the received program content is converted by the program distributor 106 into a suitable signal (a "program signal") that is ultimately communicated to the receiving device 118. Various embodiments of the receiving device 118 may receive programming from program distributors 106 and/or directly from content providers 104 via locally broadcast radio, RF signals, cable, fiber optic, Internet media, or the like via the communication system 108.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the environment 102 such as in subscriber-based telecommunications networks of the communication system 108 with high-speed access channels into the media content listening area 116 via the receiving device 118 (e.g., a set-top box or other customer-premises equipment) to bring VOD services to the media content listening area 116.

In various example embodiments, television VOD systems stream media content via the communications system 108 from files stored at a content storage system of a content delivery network operably coupled to the communication system 108, under direct or indirect control of the program distributor 106, to the receiving device 118. Television VOD systems may stream content to a receiving device 118 such as a set-top box, DVD player, game system, smart phone, television (including a smart TV), PC, a sound system receiver, a digital video recorder ("DVR"), a DVD player device, tablet device, mobile device or other computing device or media player, and the like, allowing viewing in real time at the media content listening area 116, or downloading to a receiving device 118 such as a computer, DVR (also called a personal video recorder) or portable media player for viewing at any time.

In some embodiments, the receiving device 118 may be a set-top box that is typically provided by the cable provider, satellite provider, or other program distributor 106 to which the customer may subscribe to receive such television services and that also receives programming through traditional channels using a terrestrial, satellite signal, and/or cable television format. The mobile device 128 in communication with the receiving device 118 may be provided by the program distributor, such as a cable provider or satellite provider. However, in some instances, such mobile devices may be devices other than those provided by the program distributor 106. For example, these may include various user devices such as a tablet device, game machine, smart phone, mobile device or other computing device or media player or communications device not provided by or controlled by the cable provider, satellite provider, or other program distributor to which the customer subscribes for the television services.

The audio analysis server 122 is operably coupled to the communication system 108 and may be a system of an entity that provides analysis of a plurality of collected audio samples and/or selection of reference audio clips of different genres. Each sample may be a sample of audio of different genres of programming received by a microphone of the mobile device 128, receiving device 118 and/or remote control device 130 in the media content listening area 116. For example, for each audio sample of the plurality of audio samples, the audio analysis server 122 may compare an audio signal representing the received audio of the associated reference audio clip being played to a reference audio signal representing the associated original reference audio clip. The audio analysis server 122 may then determine suggested changes to a configuration of the audio system of the media content listening area 116 to increase audio quality of the audio system for playing audio associated with particular genres of programming. Such analysis may also or instead be performed by the mobile device 128, receiving device 118 and/or remote control device 130.

The audio analysis server 122 may then communicate to the receiving device 118 results of such audio analysis and/or the suggested changes to the configuration of the audio system of the media content listening area 116. The environment 102 may include many systems associated with a television service provider, such as the program distributor 106, that operate in a manner such as the audio analysis server 122 described herein, and the audio analysis server 122 represents one or more of such systems in various embodiments. Such functionality may also or instead be performed by the receiving device 118, mobile device 128 and/or remote control device 130.

In addition, information provider 138 may provide various forms of content and/or services to various devices residing in the media content listening area 116. For example, information provider 138 may also or instead provide information to the receiving device 118 including, but not limited to: audio clips; information regarding audio clips of various different genres; databases of various audio clips associated with various different genres of programming; lists and/or associations of various different genres of programming with various different audio system configurations and settings; software and/or firmware updates for the receiving device 118; information regarding other receiving devices of a particular television service provider, such as program distributor 106; and/or metadata regarding such audio clips or audio system configuration settings for particular types, brands, models and/or manufacturers of various speakers and audio equipment.

The above description of the environment 102, the media content listening area 116, and the various devices therein, is intended as a broad, non-limiting overview of an example environment in which various embodiments of facilitating configuration of an audio system may be implemented. FIG. 1 illustrates just one example of an environment 102 and the various embodiments discussed herein are not limited to such environments. In particular, environment 102 and the various devices therein, may contain other devices, systems and/or media not specifically described herein. The environment 102 may include many different audio analysis servers, content providers, program distributors and information providers that operate in a corresponding manner as the audio analysis server 122, the content provider 104, program distributor 106 and information provider 138 as described herein. Each of audio analysis server 122, the content provider 104, program distributor 106 and information provider 138 may represent one or more of such systems in various embodiments.

Example embodiments described herein provide applications, tools, data structures and other support to implement configuration of an audio systems. Other embodiments of the described techniques may be used for other purposes, including, but not limited to, facilitating configuration of an audio systems not only during initial installation, but during subsequent service calls to the media content listening area 116. In various embodiments, the techniques described herein may be used for generating speaker settings for different genres of content; may utilize a graphical user interface to enable a user to approximate the location of speakers (e.g., speakers 142a-142e) around a room and to recommend changes to the positioning of the speakers 142a-142e; and/or to set a safe high volume level based on audio recorded using the remote control device 130 and/or mobile device 128. Also, such audio system configuration may be performed by various other devices, such as audio and DVD players, digital recorders, computers, peripherals, televisions, mobile devices, active speakers, headphones, telephones, and other electronic devices, etc. In the following description, numerous specific details are set forth, such as data formats, program sequences, processes, and the like, in order to provide a thorough understanding of the described techniques. The embodiments described can also be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
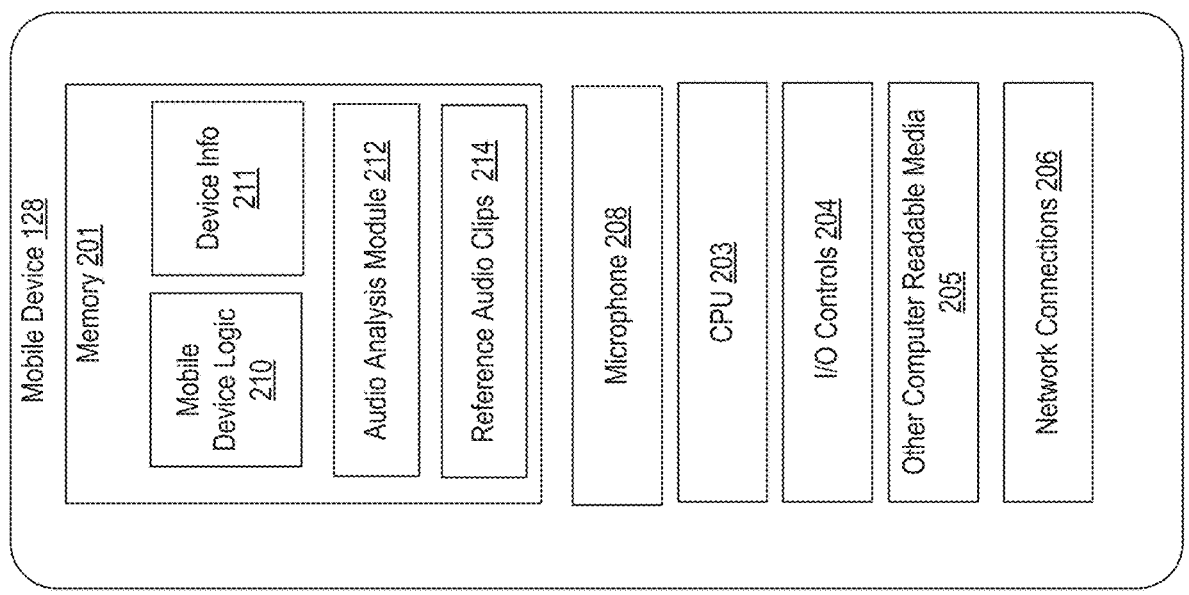
FIG. 2 is a block diagram illustrating elements of an example handheld mobile device used in systems and methods for facilitating configuration of an audio system, according to an example embodiment.

FIG. 2 is a block diagram illustrating elements of an example handheld mobile device 128 used in systems and methods for facilitating configuration of an audio system, according to an example embodiment.

Some or all of the components, modules and functionality of the mobile device 128 described herein may also or instead be included as part of, and/or be performed by, the remote control 130 and/or receiving device 118. For example, the components and functionality of the mobile device 128 associated with the collection and analysis of audio samples for audio system configuration may be included as part of and/or be performed by the remote control 130. The mobile device 128 may be a wireless handheld mobile device of a user (e.g., a television service provider technician or customer), such as a smartphone, tablet device or other mobile computing or communications device. In one embodiment, mobile device 128 comprises a computer memory ("memory") 201 and one or more Central Processing Units ("CPU") 203. Also included are input/output "I/O" controls 204, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, trackballs and/or joysticks, etc.

Microphone 208 may be a part of the I/O controls 204, or a separate microphone that collects audio of the reference audio clip being played. The microphone may be moved to or located at various different selected listening points in a user's media content listening area, such as within the user's family room, living room or other TV viewing space. The mobile device 128 and/or receiving device 118 may initiate playing of an audio clip of a particular genre. The audio of the reference audio clip being played may be used by the mobile device 128 and/or receiving device 118 for comparison to a reference audio signal representing the original reference audio clip and to determine, based on the comparison, suggested changes to a configuration of the audio system to increase audio quality of the audio system for playing audio associated with the particular genre of programming associated with the reference audio clip. The process can be performed individually for a number of different genres of programming and suggestions for changes to the configuration of the audio system made according to the genre of a currently selected or playing program. Certain genres of programming may typically include audio having similar characteristics and, due to these characteristics, the quality of the audio may be affected differently by certain audio system configurations. The genre of the program may be automatically detected by analysis of the audio characteristics by the audio analysis module 212 and/or by the system reading metadata indicative of the genre associated with the program. Examples of different genres may include, but are not limited to: action, drama, sports, news, musical performance, gaming, talk show, documentary, variety or general television programming.

The mobile device 128 may also include other computer-readable media 205 (e.g., flash memory, SIM card) and network connections 206. The I/O controls 204 may include various different numbers and configurations of controls in various embodiments, including those with touch screen buttons and other input controls.

The network connections 206 include one or more communication interfaces to the receiving device 118, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like. The one or more Central Processing Units ("CPU") 203 may be communicatively coupled to the memory 201, the microphone 208 and the I/O controls 204, other computer-readable media 205 and network connections 206, (e.g., via a communications bus) in a manner to control one or more operations of those various components.

The mobile device 128 may communicate with receiving device 118 (directly or via communication system 108), the audio analysis server 122, content provider 104, program distributor 106, and/or information provider 138, and various other devices (not shown). Mobile device logic 210, device information 211, audio analysis module 212 and reference audio clips 214 are shown residing in memory 201. In other embodiments, some portion of the device information 211 and some of, or all of, the components of the logic 210, audio analysis module 212 and reference audio clips 214 may be stored on the other computer-readable media 205. For example, the audio data samples collected by the mobile device 128 may be stored on memory 201 and/or other computer-readable media 205. The logic 210 and audio analysis module 212 preferably execute on one or more CPUs 203 and manage operation of the mobile device 128 to perform the techniques described herein. The logic 210 may comprise or implement a system control module as executed by one or more CPUs 203 that are communicatively coupled to the I/O controls 204, microphone 208 and other components of the mobile device 128. Other code or programs and potentially other data/information (not shown), may also reside in the memory 201, and may execute on one or more CPUs 203. Of note, one or more of the components in FIG. 2 may not be present in any specific implementation. For example, some embodiments may not provide other computer readable media 205.

The logic 210 and audio analysis module 212 perform the core functions of the mobile device 128, as discussed herein and also with respect to FIGS. 3 through 8. In particular, the logic 210 reads input that results from activation of I/O controls 204 on the mobile device 128 by the user and performs the function corresponding to the input, including communicating with the receiving device 118, sending commands to various devices and performing internal operations of the mobile device 128. For example, the logic 210 and audio analysis module 212, when executed on one or more CPUs 203, may perform or cause the following to be performed: initiate playing of the reference audio clips 214, such as via communication with the receiving device 118 and/or directly with the speakers 142a-142e shown in FIG. 1; activate the microphone 208 to initiate receiving audio of the reference audio clip being played, wherein the microphone is located at a selected listening point in media listening area 116 shown in FIG. 1; and communicate data representing the received audio of the reference audio clip being played. The logic 210 and audio analysis module 212, when executed on one or more CPUs 203, may also perform or cause one or more of the following to be performed: compare an audio signal representing the received audio of the reference audio clip being played to a reference audio signal representing the reference audio clip; and determine suggested changes to a configuration of the audio system to increase audio quality of the audio system for playing audio associated with the particular genre of programming associated with the received audio of the reference audio clip being played.

The audio analysis module 212 may receive input indicative of a selection of the particular genre of programming and select a reference audio clip associated with the particular genre of programming based on the received input. For example, the audio analysis module 212 may cause a graphical user interface to be presented enabling selection of the particular genre of programming. In one embodiment, the selection of the particular genre of programming associated with the reference audio clip to be selected is a selection, enabled by the graphical user interface, between two or more of the following genres: action, drama, sports, news, musical performance, gaming, talk show, documentary, variety or general television programming.

In performing the comparison of the audio signal representing audio of the reference audio clip of the particular genre received at the microphone to the reference audio signal representing the reference audio clip of the particular genre, the audio analysis module 212 may determine how closely they match and also determine other audio characteristics. For example, the closer the two signals match, the fewer or less drastic changes need to be made to the audio system to increase audio quality of the audio system for playing audio associated with the particular genre of programming. The audio analysis module 212 may determine other audio characteristics of the audio clip received at the microphone as well as determine acoustic qualities of the media content listening area 116 shown in FIG. 1 on which to base the determination of suggested changes to the configuration of the audio system to increase audio quality of the audio system. For example, depending on the phasing of overlapping sound waves represented in the received audio of the reference audio clip, they can amplify or diminish a particular frequency range in the audio spectrum in a specific area of the media content listening area 116. Thus, based on the configuration of the audio system (e.g., the shape of the room, the furniture of the room, the construction materials of the room, wall treatments and the speaker positioning within the room), received audio from the microphone 208 of mobile device 128 at a first listening point within the media content listening area 116 may have a different mix of phasing of overlapping sound waves compared to received audio captured from the microphone 208 of the mobile device 128 at a second listening point within the media content listening area 116. Volume and frequencies may also differ in various places in the media content listening area 116 and, depending on how sound waves overlap in the room, certain sound can get diminished or cancelled out.

In some embodiments, the audio analysis module 212 may measure volume, frequencies, tone and the phasing of overlapping sound waves represented in the received audio of the reference audio clip. The audio analysis module 212 may include or utilize a frequency spectrum analyzer to perform and/or enable such measurements. The audio analysis module 212 may also perform measurements based on psychoacoustics, such as the measurement of noise, which may utilize a weighting filter to do so. Such measurements may also be compared to corresponding measurements made of the original reference audio signal representing the reference audio clip. In one example, the audio analysis module 212 may use such measurements and comparison to detect flutter echoes, reverb or other undesirable effects. The intensity of these echoes, or degree of difference of such characteristics between the audio received at the microphone 208 and the original reference audio signal, may denote the quality of the acoustics in the media content listening area 116. Such effects may be decreased or eliminated by changing configuration of the audio system (e.g., changing the type and/or positioning of furniture of the room, the construction materials of the room, wall treatments and/or the speaker positioning within the room). For example, if the audio analysis module 212 detects intense flutter echoes above a threshold frequency or amplitude, the audio analysis module 212 may suggest to treat the walls, and possibly the floors and ceilings. Treatments can be as simple as hanging tapestries and putting down a rug, or as complicated as re-flooring or lining the walls with specialized acoustic treatments. A general objective for increasing audio quality is to disperse and absorb sound waves using a greater surface area and odd angles. Thus, the audio analysis module 212 may suggest adding, changing and/or reconfiguring furniture or construction materials accordingly. As another example, if the audio analysis module 212 determines the bass frequencies are diminished in the received audio of the reference audio clip, the audio analysis module 212 may output a suggestion to move a sub-woofer speaker closer to a corner of the room and/or move furniture on which the listener will usually be sitting while watching television closer to a corner of the room, since the corners of a room are notorious for accumulating bass frequencies.

The audio analysis module 212 may store in memory 212 and/or have access to information regarding how different configurations of audio systems affect sound quality. For example, the audio analysis module 212 may store in memory 201 and/or have access to information regarding how materials of the room will determine how easy it is for the sound waves to bounce. Since it is generally desirable for sound quality to have the sound to be either dispersed and/or absorbed, wall, ceiling, and floor materials may be considered by the audio analysis module 212. For a surface to absorb as much of the sound as possible, it is preferable to use materials with a large surface area. Carpet will absorb more sound than wood flooring, because the sound waves will vibrate in the nooks and crannies of the surface. Curtains, tapestries, and other cloth-based wall coverings will help to dissipate and absorb sound better than the smooth surface of a wall. Also, the furniture inside the space of the media content listening area 116 will influence the paths of the sound waves. Similar to the walls, it is preferable to have furniture that is absorbent. With furniture, however, the audio analysis module 212 may also consider the size of the room. If the media content listening area 116 is a large room then it may be preferable to have furnishings to take up some of the empty airspace. However, if the room is quite small, too many furnishings will leave little room for all the sound to travel, which may result with a room that is too loud and sounds busy. Information regarding such characteristics of audio system configurations and resulting effects on sound quality may be used by the audio analysis module 212 to make suggested changes to the configuration of the audio system.

The suggested changes to the configuration of the audio system include, but are not limited to, suggested changes regarding one or more of: speaker settings, speaker positions within a listening area, speaker physical position relative to a listening point in a listening area, speaker physical position relative to other speakers, speaker physical angle relative to a listening point in a listening area, speaker physical angle relative to other speakers, volume settings, audio equalization settings, audio bass settings, audio treble settings, audio tone settings, speaker fade settings, speaker balance settings, center speaker settings, dialogue audio settings, surround system settings, sound effect settings, reverb settings, audio channel settings, listening area room size, listening area room shape, listening area furniture layout, listening area furniture type, listening area furniture dimensions, listening area construction materials, listening area sound dampening materials, listening area wall coverings, listening area floor covering, listening area acoustic characteristics, and ambient noise.

For example, the audio analysis module 212 may play a plurality of times the reference audio clip associated with the particular genre of programming. For each time of the plurality of times that the reference audio clip is played, the audio analysis module 212 may receive, at the microphone 208 of the handheld mobile device 128, audio of the reference audio clip being played. The handheld mobile device 128 may be located at a different selected listening point in the media content listening area 116 each time by the user moving about the media content listening area 116 with the handheld mobile device 128. The audio analysis module 212 may then compare different acoustic characteristics of the audio of the reference audio clip from each different selected listening point in the media content listening area 116 based on the handheld mobile device 128 being located at a different selected listening point in a media content listening area 116 each time. The audio analysis module 212 may then determine, based on the different acoustic characteristics of the audio of the reference audio clip from each different selected listening point in the listening area or other sound quality measurements, suggested changes to a configuration of the audio system to increase audio quality of the audio system for playing audio associated with the particular genre of programming.

The audio analysis module 212 may also determine a safe high volume level for the audio system. For example, the audio analysis module 212 may estimate a loudness level of the received audio of the reference audio clip; associate the estimated loudness level of the received audio with a current volume setting of the audio system; compare the estimated loudness level of the received audio to a reference safe loudness level; and determine the safe high volume level for the audio system based on the association of the estimated loudness level of the received audio to the current volume setting of the audio system and the comparison of the estimated loudness level of the received audio to the reference safe loudness level. In one embodiment, if the audio analysis module 212 determines that the current volume setting results in a loudness level above the reference safe loudness level, the audio analysis module 212 may determine a safe high volume level at a volume level setting below the current volume level setting. The specific level below the current volume setting at which the safe high volume level is determined to be at may be based on the amount or degree the estimated loudness level is above the reference safe loudness level. Multiple reference audio clips may be played and their associated system volume level settings recorded. Then the estimated loudness levels of the reference audio clips played at the associated system volume levels may be compared to the reference safe high volume loudness level to determine a maximum safe volume level setting for the system.

In at least some embodiments, remote and/or programmatic access is provided to at least some of the functionality of the mobile device 128 and/or receiving device 118. For example, the mobile device 128 and/or receiving device 118 may provide to other devices an application program interface ("API") that provides access to various functions of the mobile device 128 and/or receiving device 118, including access to information stored by the mobile device 128 and/or receiving device 118 (e.g., about other media devices) and different audio clips associated with different genres of programming. In this manner, the API may facilitate the development of third-party software, such as user interfaces, plug-ins, adapters and the like, such as for integrating functions of the mobile device 128 and/or receiving device 118 into various user interface applications on media devices and various desktop or mobile device applications. For example, a particular mobile device application may present a graphical display showing an indication of available reference audio clips to play and their associated genres. Also, a particular mobile device application may present a graphical display enabling selection of different locations on a rendering (e.g., a map) of the media content listening area 116 to indicate speaker positions within a listening area. The audio analysis module 212 may then receive a selection of the different locations on the rendering of the listening area via the graphical user interface and determine suggested changes to a configuration of the audio system based on the speaker positions within the listening area indicated by the received selection. In some embodiments, a particular mobile device application may present a customized or different user interface based upon the functionality and capabilities of the mobile device 128 and/or the receiving device 118.

In an example embodiment, the logic 210 and audio analysis module 212 are implemented using standard programming techniques. For example, the logic 210 and audio analysis module 212 may be implemented as a "native" executable running on the CPU 203, along with one or more static or dynamic libraries. In other embodiments, the logic 210 and audio analysis module 212 may be implemented as instructions processed by a virtual machine that executes as some other program. In general, a range of programming languages known in the art may be employed for implementing such example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use well-known or synchronous or asynchronous client-server computing techniques. However, the various components may be implemented using more monolithic programming techniques as well, for example, as an executable running on a single CPU computer system, or alternatively decomposed using a variety of structuring techniques including, but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the mobile device 128.

In addition, programming interfaces to the data stored as part of the device information 211 can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The device information 211 and reference audio clips 214 (which may include collected audio data, programming content genre information, audio system configurations, mobile device information, data representing receiving device software and/or firmware updates and receiving device information) may be implemented as one or more database systems, file systems, or any other technique for storing such information, or any combination of the above, including, in some embodiments, implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the mobile device 128.

Furthermore, in some embodiments, some or all of the components/portions of the logic 210 and audio analysis module 212 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

Some or all of the components, modules and functionality of the mobile device 128 described herein (including the audio analysis module 212) may also or instead be included as part of, and/or be performed by, the receiving device 118. For example, the components and functionality of the mobile device 128 associated with the collection and analysis of audio samples for audio system configuration may be included as part of and/or be performed by the receiving device 118. In one embodiment, the receiving device 118 may include one or more CPUs coupled to one or more memory devices that store computer executable instructions that, when executed by the one or more CPUs, cause the receiving device 118 to perform the techniques described herein.

Figure 3:
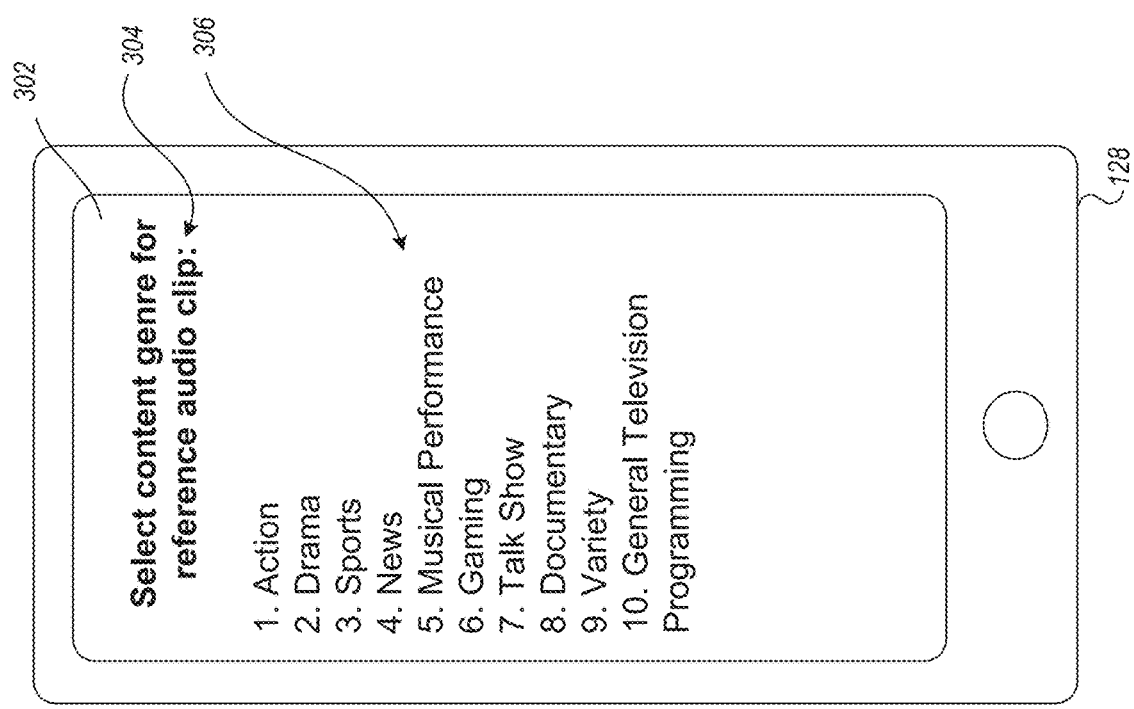
FIG. 3 is a diagram of an example handheld mobile device illustrating an example user interface screen shown for selecting a reference audio clip in an example process for facilitating configuration of an audio system, according to an example embodiment.

FIG. 3 is a diagram of an example handheld mobile device 128 illustrating an example user interface screen 302 for selecting a reference audio clip in an example process for facilitating configuration of an audio system, according to an example embodiment.

A mobile device application of mobile device 128 may present a graphical display on user interface screen 302 showing a selectable list 306 of available content genres for reference audio clips. Certain genres of programming may typically include audio having similar characteristics and, due to these common characteristics, the quality of the audio of programming of different genres may be affected differently by certain audio system configurations. In order to receive from the system the suggested changes to the configuration of the audio system to increase audio quality of the audio system for playing audio associated with a particular genre of programming, the user may select from the list 306 (e.g., by mouse click, remote control buttons, or touch screen selection, etc.) the particular desired genre of programming of the reference audio clip the system will play to determine the suggested changes.

This audio of the reference audio clip may be used by the system for comparison to a reference audio signal representing the reference audio clip and to determine, based on the comparison, suggested changes to a configuration of the audio system to increase audio quality of the audio system for playing audio associated with the particular genre of programming associated with the reference audio clip. The process can be performed individually for a number of different genres of programming and suggestions for changes to the configuration of the audio system made according to the genre of a currently selected or playing program, as certain genres of programming may typically include audio having similar characteristics and, due to these characteristics, the quality of the audio may be affected differently by certain audio system configurations. The genre of the program may be automatically detected by analysis of the audio characteristics and/or by the system reading metadata indicative of the genre associated with the program. Also shown is a prompt 410 to prompt the user to select an available genre from the list 306. Examples of different genres may include, but are not limited to: action, drama, sports, news, musical performance, gaming, talk show, documentary, variety or general television programming.

Figure 4:
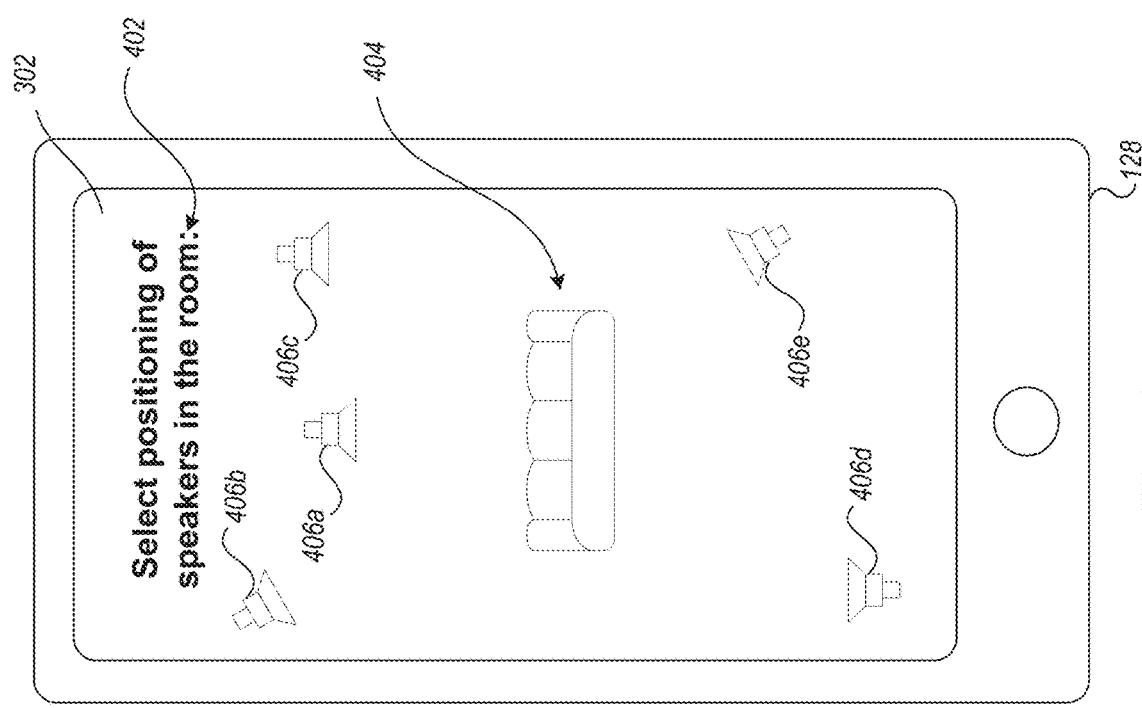
FIG. 4 is a diagram of an example handheld mobile device illustrating an example user interface screen shown for selecting positioning of speakers in an example process for facilitating configuration of an audio system, according to an example embodiment.

FIG. 4 is a diagram of an example handheld mobile device 128 illustrating an example user interface screen 302 for selecting positioning of speakers in an example process for facilitating configuration of an audio system, according to an example embodiment. As shown in FIG. 4, the application of the mobile device 128 presents a graphical display showing a rendering of a listening area (e.g., a map of a room) to enable a user to indicate speaker positions within the listening area. The system may receive a selection of the different locations on the rendering of the listening area via the graphical user interface. For example, shown are four selectable and movable speaker markers 406a-406e, which may be selected and moved by the user to different locations on the user interface screen 302 displaying the rendering of the listening area to indicate corresponding physical locations within the listening area of the current position of the speakers. In some embodiments, the rendering of the listening area may be three dimensional (3D) and the 3D view of the listening area adjustable by the user such that the user may indicate in 3D space within the listening area the positions of the speakers using the speaker markers 406a-406e.

The user may also indicate locations of other objects in the listening area using markers, such as furniture using furniture marker 404. In some embodiments, the user may also indicate selected listening points within the listening area using selectable and/or movable markers on the example user interface screen 302. Also, in some cases, the location of the furniture marker 404 (such as a marker for a couch or chair) may also be an indication of the listening point(s). In some embodiments, the user may also indicate or otherwise input other characteristics of the listening area, such as the shape of the room, the type of furniture of the room, the construction materials of the room, wall treatments, floor treatments, etc.

The system may then determine suggested changes to a configuration of the audio system based on the speaker positions within the listening area indicated by the received selection of the different locations on the rendering of the listening area (and in some embodiments the indicated locations of furniture, the indicated listening point(s), the indicated shape of the room, the indicated type of furniture of the room, the indicated construction materials of the room, floor treatments and/or wall treatments) to increase audio quality of the audio system having such characteristics.

Figure 5:
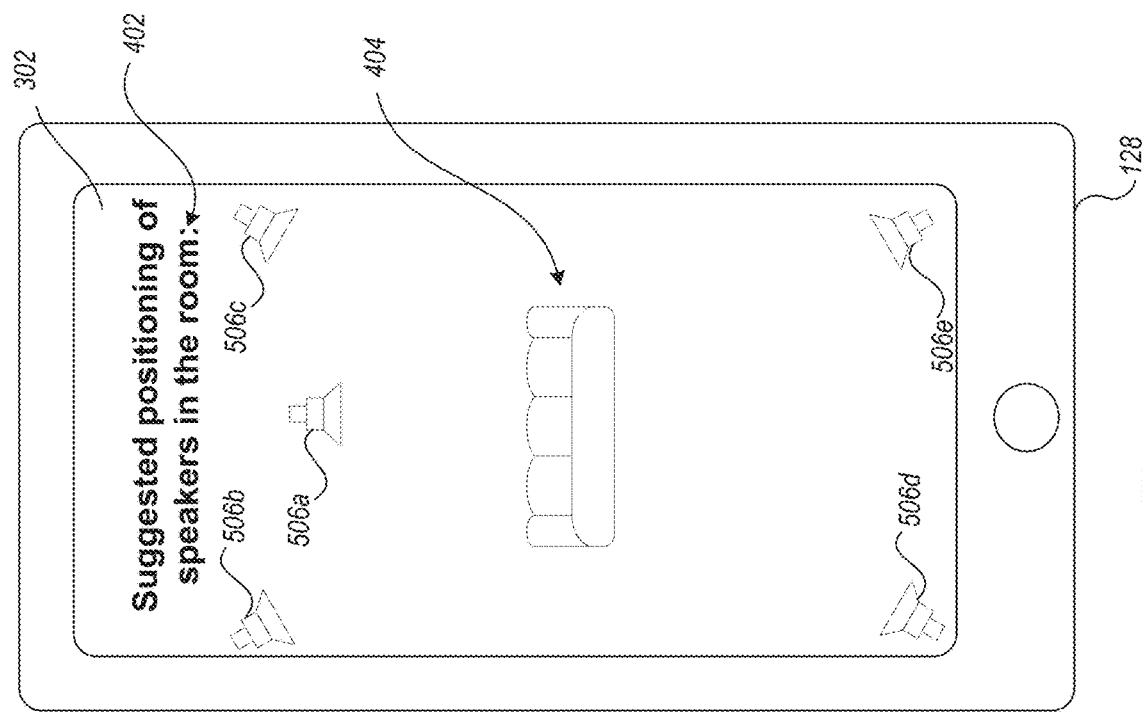
FIG. 5 is a diagram of an example handheld mobile device illustrating an example user interface screen showing suggested positioning of speakers in an example process for facilitating configuration of an audio system, according to an example embodiment.

FIG. 5 is a diagram of an example handheld mobile device 128 illustrating an example user interface screen 302 showing suggested positioning of speakers in an example process for facilitating configuration of an audio system, according to an example embodiment.

In response to or otherwise as a result of receiving the selection of the different locations of the speakers on the rendering of the listening area via the graphical user interface shown in FIG. 4 (and in some embodiments the indicated locations of furniture, the indicated listening point(s), the indicated shape of the room, the indicated type of furniture of the room, the indicated construction materials of the room, floor treatments and/or wall treatments), the system may determine suggested changes to a configuration of the audio system based on such characteristics. For example, such changes may include a suggested repositioning of the speakers to increase the audio quality of the audio system in the listening area. An example of a suggested repositioning of speakers is shown by the suggested speaker position markers 506a-506e. Also, the example user interface screen 302 may display an indication of suggested changes 402. In the illustrated embodiment, the indication of suggested changes 402 indicates that the suggested speaker position markers 506a-506e are suggested positioning of speakers within the room.

Figure 6:
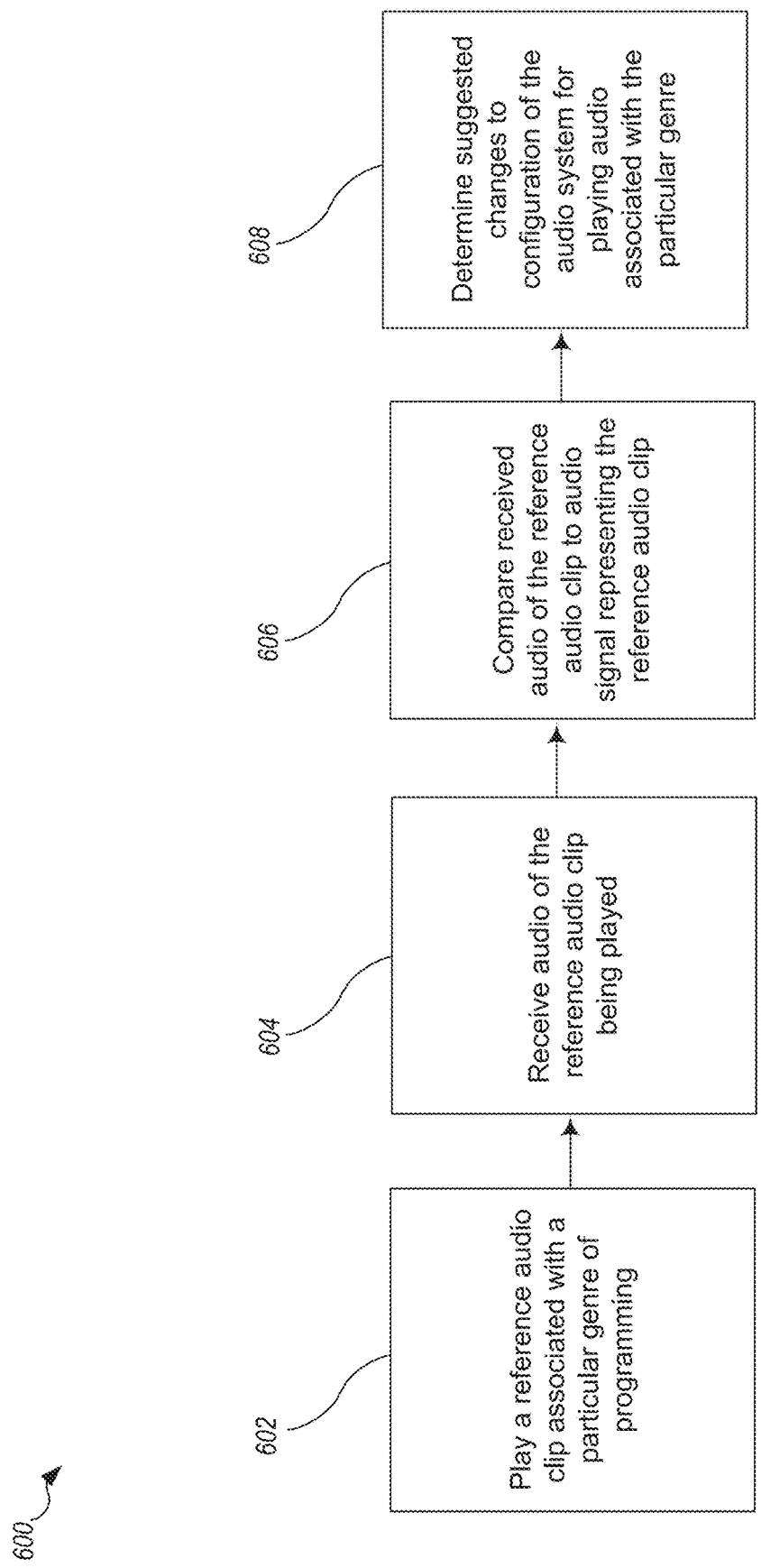
FIG. 6 is a flow diagram of an example method for determining suggested changes to a configuration of an audio system, according to an example embodiment.

FIG. 6 is a flow diagram of an example method 600 for determining suggested changes to a configuration of an audio system, according to an example embodiment.

At 602, the system for facilitating configuration of an audio system plays a reference audio clip associated with a particular genre of programming.

At 604, the system receives, at a microphone of the system, audio of the reference audio clip being played. The microphone may be located at a selected listening point within the listening area.

At 606, the system compares an audio signal representing the received audio of the reference audio clip being played to a reference audio signal representing the reference audio clip.

At 608, the system determines suggested changes to a configuration of the audio system to increase audio quality of the audio system for playing audio associated with the particular genre of programming.

Figure 7:
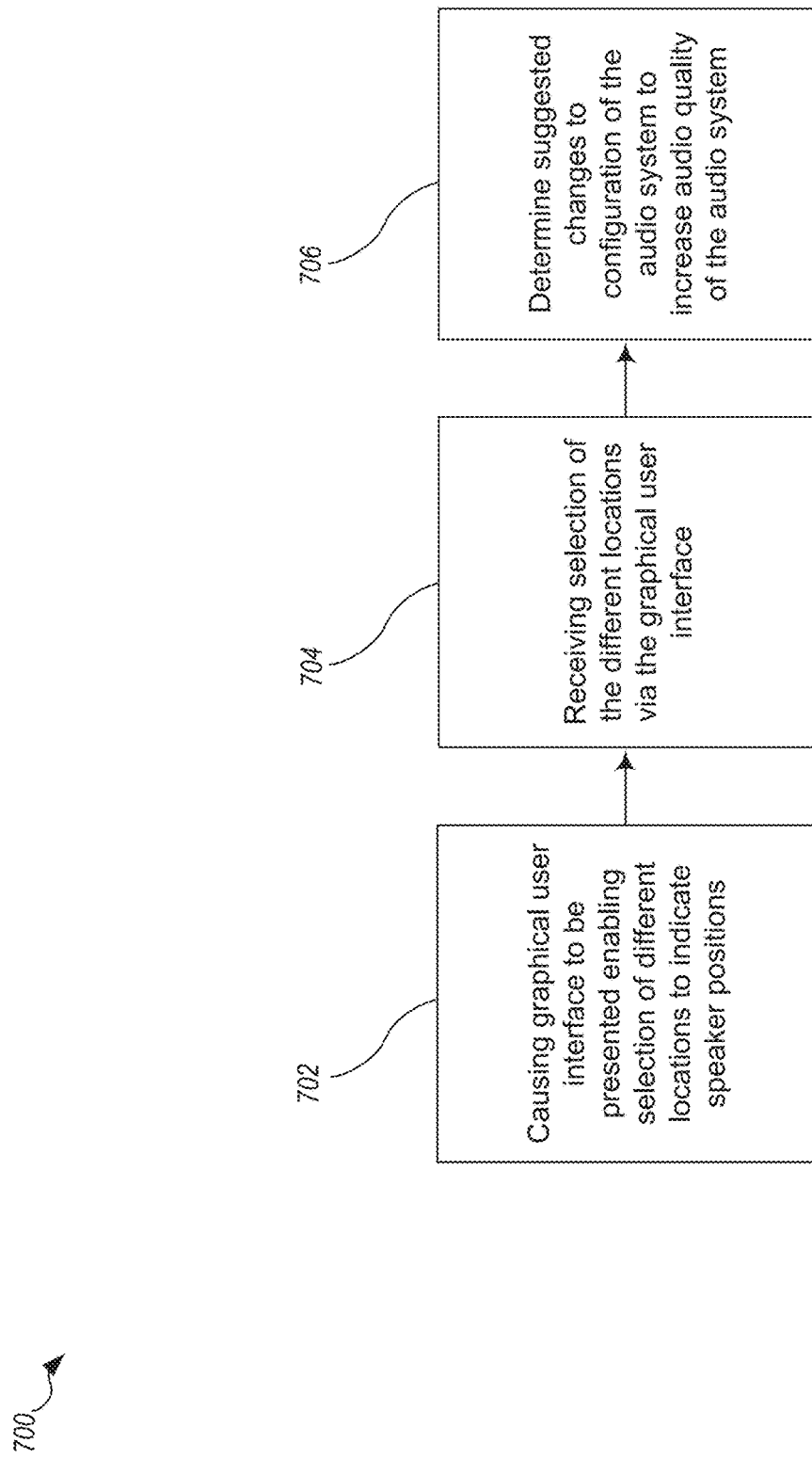
FIG. 7 is a flow diagram of an example method for determining suggested changes to a configuration of an audio system based on indicated speaker positions, according to an example embodiment.

FIG. 7 is a flow diagram of an example method 700 for determining suggested changes to a configuration of an audio system based on indicated speaker positions, according to an example embodiment.

At 702, the system for facilitating configuration of an audio system causes a graphical user interface to be presented enabling selection of different locations on a rendering of the listening area to indicate speaker positions within the listening area.

At 704, the system receives a selection of the different locations on the rendering of the listening area via the graphical user interface.

At 706, the system determines suggested changes to a configuration of the audio system based on the speaker positions within the listening area indicated by the received selection of the different locations on the rendering of the listening area to increase audio quality of the audio system having the indicated speaker positions within the listening area.

Figure 8:
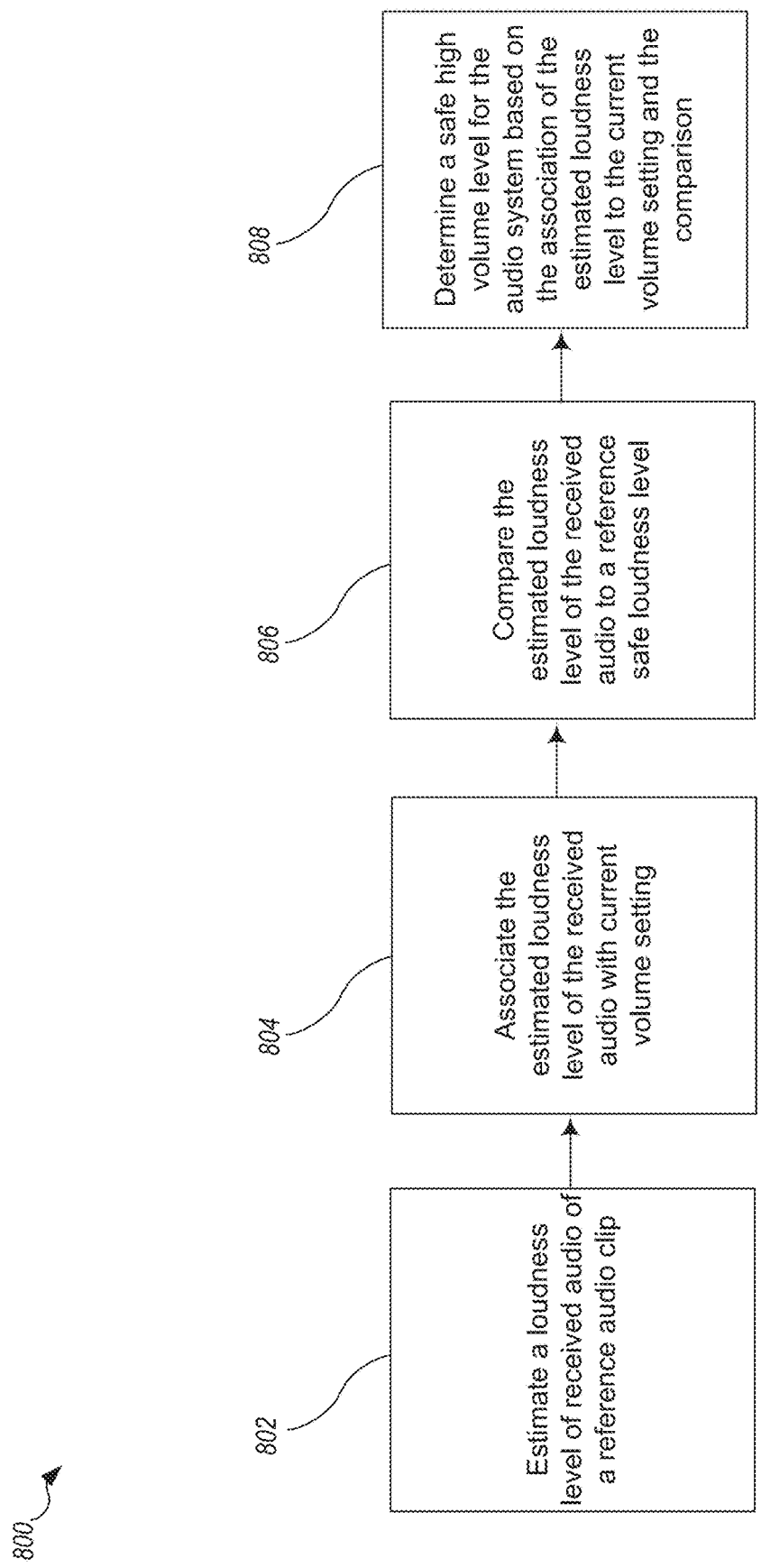
FIG. 8 is a flow diagram of an example method for determining a safe high volume level of an audio system, according to an example embodiment.

FIG. 8 is a flow diagram of an example method 800 for determining a safe high volume level of an audio system, according to an example embodiment.

At 802, the system estimates a loudness level of received audio of a reference audio clip.

At 804, the system associates the estimated loudness level of the received audio with a current volume setting of an audio system.

At 806, the system compares the estimated loudness level of the received audio to a reference safe loudness level.

At 808, the system determines a safe high volume level for the audio system based on the association of the estimated loudness level of the received audio to the current volume setting of the audio system and the comparison of the estimated loudness level of the received audio to the reference safe loudness level.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for facilitating configuration of an audio system, comprising:
    playing, by at least one computer processor of a system for facilitating configuration of an audio system, a reference audio clip associated with a particular genre of programming;
    receiving, at a microphone of the system for facilitating configuration of the audio system, audio of the reference audio clip being played, wherein the microphone is located at a selected listening point;
    comparing, by at least one computer processor of the system for facilitating configuration of an audio system, an audio signal representing the received audio of the reference audio clip being played to a reference audio signal representing the reference audio clip; and
    determining, based on the comparison, by at least one computer processor of a system for facilitating configuration of an audio system, suggested changes to a configuration of the audio system to increase audio quality of the audio system for playing audio associated with the particular genre of programming.

2. The method of claim 1 wherein the suggested changes to the configuration of the audio system include suggested changes to speaker positions within a listening area.

3. The method of claim 1 wherein the particular genre of programming is:
    action, drama, sports, news, musical performance, gaming, talk show, documentary, variety or general television programming.

4. The method of claim 1, further comprising:
    receiving, by at least one computer processor of a system for facilitating configuration of an audio system, input indicative of a selection of the particular genre of programming; and
    selecting, by at least one computer processor of a system for facilitating configuration of an audio system, the reference audio clip associated with the particular genre of programming based on the received input.

5. The method of claim 4, further comprising:
    causing, by at least one computer processor of a system for facilitating configuration of an audio system, a graphical user interface to be presented enabling selection of the particular genre of programming, wherein the receiving input indicative of the selection of the particular genre of programming includes receiving a selection of the particular genre of programming via the graphical user interface.

6. The method of claim 5 wherein the selection of the particular genre of programming associated with the reference audio clip to be selected is a selection, enabled by the graphical user interface, between two or more of: action, drama, sports, news, musical performance, gaming, talk show, documentary, variety or general television programming.

7. The method of claim 1, further comprising:
    receiving, by at least one computer processor of a system for facilitating configuration of an audio system, input indicative of speaker positions within a listening area, and wherein the determining the suggested changes to the configuration of the audio system includes:
        determining the suggested changes to the configuration of the audio system based on the speaker positions within a listening area and on the comparison of the audio signal representing the received audio of the reference audio clip being played to the reference audio signal representing the reference audio clip to increase audio quality of the audio system for playing audio associated with the particular genre of programming.

8. The method of claim 7, further comprising:

causing, by at least one computer processor of a system for facilitating configuration of an audio system, a graphical user interface to be presented enabling selection of different locations on a rendering of the listening area to indicate the speaker positions within the listening area, wherein the receiving input indicative of the speaker positions within the listening area includes receiving a selection of the different locations on the rendering of the listening area via the graphical user interface.

9. The method of claim 1 wherein the playing the reference audio clip associated with the particular genre of programming includes playing the reference audio clip from a handheld mobile device.

10. The method of claim 1 wherein the playing the reference audio clip associated with the particular genre of programming includes outputting the reference audio clip from a set-top box.

11. The method of claim 1 wherein the receiving the audio of the reference audio clip includes receiving the audio of the reference audio clip at a set-top box.

\* \* \* \* \*